July 25, 1933.   H. HUEBER ET AL   1,920,144
AEROPLANE WINDOW CLEANER
Filed Nov. 1, 1929
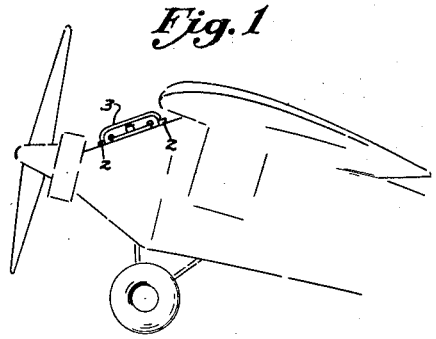
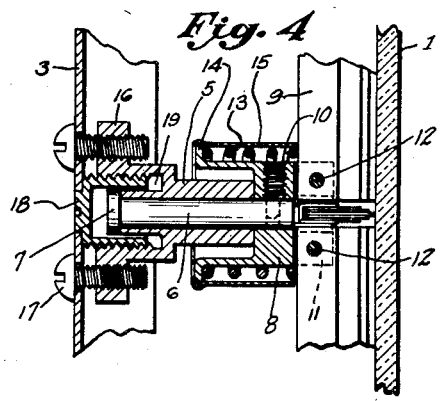
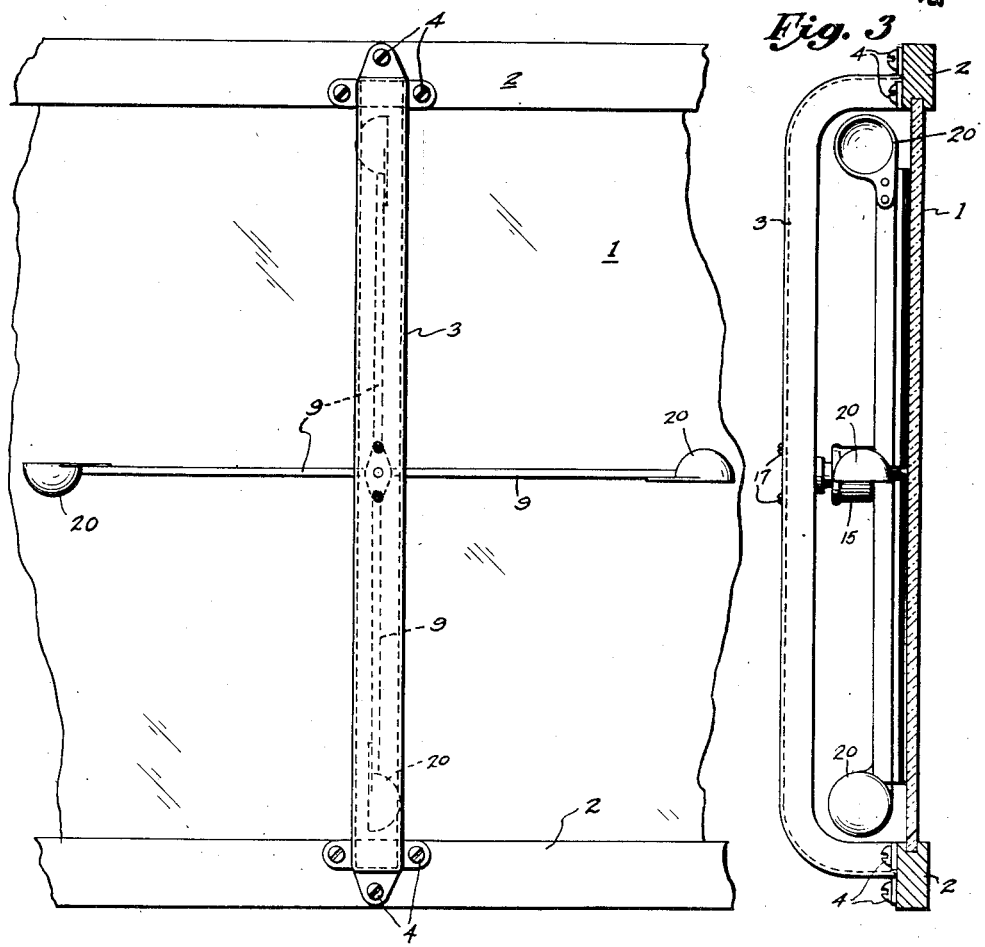
Inventors
Henry Hueber
Erwin C. Horton
by Barton A. Bean Jr.
Attorney Patented July 25, 1933

1,920,144

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

AEROPLANE WINDOW CLEANER

Application filed November 1, 1929. Serial No. 404,152.

This invention relates to a windshield or window cleaner primarily adapted for aeroplanes though applicable to other vehicles, and its aim is to provide an efficient windshield cleaner which may be driven or impelled by the wind of high velocity, as it is created under flying conditions.

The windows or windshields of aeroplanes through which forward vision is obtained are disposed so as to be impinged upon by a large head of wind of high velocity and pressure, and when the propeller is forward of the window this air pressure and wind velocity is augmented. Usually, these windows are inclined and therefore the wind strikes the same with a more or less glancing sweep. The motor vehicle windshield cleaner, whether of the electric or fluid pressure type, would fail to function efficiently again this wind resistance. Advantage is, therefore, taken of this excessive wind pressure to drive the windshield cleaner for maintaining a clear field of vision for the aviator.

The invention further resides in providing the cleaner or wiper blade with a wind-actuated driving member carried thereby so that the wiper will receive directly the force imparted by the wind; in providing a rotatably mounted windshield cleaner having a radial arrangement of wiping members or blades; and in providing an efficient wiping contact with the glass by a single pressure member common to the several wiping blades.

The invention further resides in the novel mounting of the windshield cleaner and the features of construction together with the arrangements and combinations of parts hereinafter described in detail, reference being had to the accompanying drawing wherein, Fig. 1 is a more or less schematical elevation of an aeroplane equipped with a windshield cleaner embodying the present invention.

Fig. 2 is a front elevation of the cleaner mounted on the windshield, the latter being shown in fragment.

Fig. 3 is a side elevation of the invention disclosed in Fig. 2.

Fig. 4 is a sectional view through the cleaner blade mounting.

Proceeding in accordance with the present invention, a windshield or window 1 is provided with a frame 2 on which the cleaner is preferably mounted as by means of a bracket or support 3. In the present disclosure the bracket 3 spans the window transparency and is secured to the frame 2 by suitable fasteners 4.

For lightness in construction this spanning bracket may be of channel formation, in the channel of which may be arranged one end of a shaft-bearing member 5. The windshield cleaner shaft 6 is journaled in this bearing member and carries on its inner end a retaining shoulder 7 while on its outer, projecting end is mounted a wiper head consisting of a hub 8 and a plurality of radiating wiper blades 9. The hub may be fixed to the shaft as by means of a set screw 10, and extending from the outer end of the hub are spaced pairs of ears 11 between which the inner ends of the wiper blades 9 are pivotally mounted, as by means of pivots 12. Means are provided for urging the wiper blades about their pivots toward the windshield glass so as to obtain an efficient wiping contact therewith. In the present disclosure this pressure means comprises a coil spring 13 which surrounds the hub 8 and is backed by a retaining flange 14 on the hub while the opposite end of the spring finds support on the back edges of the wiper blades 9 at points disposed radially outwardly from the pivot or hinge pins 12 whereby the spring tension, in a direction parallel to the rotating axis, will urge the wiper blades into wiping contact with the windshield glass. An enclosing cover 15 may be provided about the spring 13.

The cleaner is adjustably mounted on its supporting bracket and to this end a pair of ears 16 is provided on the end of the bearing member within the channel of bracket 3, and attaching screws 17 are passed through the bracket into threaded engagement with said ears thereby providing a suitable means of attachment for the cleaner unit. A pressure-controlling member 18 is interposed between the bracket 3 and the bearing member 5 and is designed for setting the bearing member relative to the windshield glass whereby the wiping edges of the blades 9 are adjusted toward and from the glass. In the present form the pressure adjusting member 18 is threadedly engaged in a socket 19 provided in the inner end of the bearing member, and said pressure-controlling member 18 finds opposed bearing on the bracket, the latter being provided with an aperture through which access may be gained to said member 18 for adjusting it as desired. As shown in Fig. 4 the screws 17 extend loosely through the bracket 3 with their heads normally tightened against the outer surface of this bracket. By rotating the member 18, as with a screw driver, in such direction as to urge the cleaner unit bodily away from the windshield glass, the wiping contact is maintained by reason of the spring 13, and portions of the shanks of the screws 17 are projected beyond the outer surface of the bracket 3. Then the screws are tightened again to lock the member 18 in adjusted position between the bracket 3 and the bearing member 5. When the adjustment of the unit toward the windshield is desired the screws 17 are first loosened, the member 18 then adjusted, and the screws 17 again tightened to lock the parts together.

The motive power for driving the radiating blades 9 is furnished by the head of wind against which the aeroplane is moving. To insure of this force being applied directly and effectively to the wipers there are provided driving means embodying impellers carried by the blades themselves. The impellers preferably assume the form of conical or hemispherical wind cups 20 which face in the same general circumferential direction, whereby the impelling force of the wind will impart a rotative movement to the wiper blades and clean a circular zone on the windshield through which clear vision may be obtained. The wind engaging the window or windshield at an angle will sweep across the same at a high velocity, and operatively contact with the cups 20 so as to rotate the cleaner at a high and effective speed. The cups, by being mounted at the outer ends of the blades, transmit the maximum driving force from the wind to the cleaner without undue wear and tear either on the mounting or on the rotating parts.

Since the propeller of the aeroplane as shown in Fig. 1 is directly in front of the windshield 1 and the air current or the so-called slip stream from the propeller strikes the wiper blade and cups 20 with greater force than the force that would be encountered outside the slip stream, the maximum efficiency in operating the wiper is insured.

What is claimed is:

1. A cleaner for aeroplanes having forwardly sloping windshields, comprising a bracket adapted for being mounted on the frame of a windshield, a shaft, a bearing member for the shaft, means adjustably attaching the bearing member to the bracket, said member having a socket opposing the bracket and said bracket having an aperture opposing the socket, a pressure-controlling member threaded in the socket and having end thrust support on the bracket about the aperture and being accessible therethrough, a wiper head carried by the shaft and adjustable therewith, said head including a wiper blade, means resiliently urging the blade into wiping position, and propelling means for the blade.

2. A windshield cleaner comprising a wiper head having a plurality of wiper blades arranged radially, means urging the blades into wiping contact with the windshield glass, and wind cups opening in directions substantially transverse of the axis of rotation of the blades and operable by air currents passing transversely of the axis of radial arrangement of the blades to actuate the blades, said cups being carried on the outer extremities of said radially arranged blades.

3. A windshield cleaner comprising a plurality of radially related wiper blades free at their outer ends, means mounting the same for rotation, and a plurality of wind cups opening in directions substantially transverse of the axis of rotation of the blades and operable by air currents passing transversely of the axis of radial arrangement of the blades to actuate the blades, said cups being carried on the outer ends of said blades.

4. A windshield cleaner comprising a support, a bearing member adjustably mounted thereon, a shaft journalled in said bearing member and supported thereby, a wiper head carried by said shaft and movable therewith by and during adjustment of said bearing member, a pressure controlling member interposed between said bearing member and said support in bearing relation therewith for adjusting said bearing member relative to said support, said pressure controlling member being accessible on the side of said support opposite from said bearing member.

5. A windshield cleaner comprising a multi-bladed wiper head mounted for rotation about an axis perpendicular to the windshield, means so mounting said wiper head, and wind-propelled cups opening in directions substantially transverse of the axis of rotation of the blades and operable by air currents passing transversely of the axis of radial arrangement of the blades to actuate the blades, said cups being carried on each blade of said multi-bladed head for rotating the same.

6. In a windshield cleaner, a rotatable hub, a plurality of wiper blades carried by the hub and extending radially therefrom, each of said blades having an articulated connection with the hub for movement relative to the hub into wiping contact with a windshield glass, and a coil spring having one end anchored relative to the hub and the other end engaged with all of said blades for urging the latter into such wiping contact.

7. In a windshield cleaner, a rotatable hub, a plurality of wiper blades carried by the hub and extending radially therefrom, each of said blades having articulated connection with the hub for movement into wiping contact with a windshield glass, a spring means anchored relative to the hub and having a substantially annular portion engaging all of said wiper blades, whereby said spring means will urge all of said blades toward the windshield for wiping contact therewith.

8. In a windshield cleaner, a rotatable hub, a plurality of wiper blades carried by the hub and extending radially therefrom, each of said blades having an articulated connection with the hub for movement relative to the hub into wiping contact with a windshield glass, and means for urging the blades into such wiping contact, said means comprising a portion engaging all of said blades and a resilient portion engaging the hub and said first mentioned portion for urging movement of the first mentioned portion to press all of said blades into such wiping contact.

9. A windshield cleaner comprising a bracket, a bearing member adjustably mounted thereon, a shaft journalled in said bearing member and supported thereby, a wiper member rotatable with said shaft and movable axially therewith by and during adjustment of said bearing member, and means for adjusting said bearing member on said bracket axially of said shaft, the shaft and the entire bearing member therefor being disposed on one side of the bracket.

10. A windshield cleaner comprising a support, a bearing member thereon, a shaft journalled in said bearing member, said bearing member being adjustable in a direction axial of the shaft, a wiper member carried by said shaft and bodily movable therewith by and during adjustment of said bearing member, and a pressure controlling member interposed between said bearing member and its support and axially of said shaft for adjusting said bearing member toward and from the windshield glass, the shaft and the entire bearing member therefor being disposed on one side of the bracket.

HENRY HUEBER.
ERWIN C. HORTON.